(12) United States Patent
Jalkanen et al.

(10) Patent No.: US 10,390,211 B2
(45) Date of Patent: Aug. 20, 2019

(54) ROAMING SOLUTION

(71) Applicant: Telia Company AB, Solna (SE)

(72) Inventors: Tero Jalkanen, Tuusula (FI); Tomi Sarajisto, Helsinki (FI)

(73) Assignee: TELIA COMPANY AB, Solna (SE)

( * ) Notice: Subject to any disclaimer, the term of this patent is extended or adjusted under 35 U.S.C. 154(b) by 0 days.

(21) Appl. No.: 15/914,663

(22) Filed: Mar. 7, 2018

(65) Prior Publication Data
US 2018/0262901 A1    Sep. 13, 2018

(30) Foreign Application Priority Data

Mar. 7, 2017 (EP) .................................... 17159620

(51) Int. Cl.
| | | |
|---|---|---|
| *H04W 4/00* | (2018.01) | |
| *H04W 8/12* | (2009.01) | |
| *H04W 8/20* | (2009.01) | |
| *H04W 48/16* | (2009.01) | |
| *H04W 48/20* | (2009.01) | |

(Continued)

(52) U.S. Cl.
CPC ............. *H04W 8/12* (2013.01); *H04W 8/20* (2013.01); *H04W 48/16* (2013.01); *H04W 48/20* (2013.01); *H04M 1/72519* (2013.01); *H04M 1/72522* (2013.01); *H04W 88/02* (2013.01)

(58) Field of Classification Search
CPC ......... H04W 8/06; H04W 8/12; H04W 8/183; H04W 8/04; H04W 60/00; H04W 60/04; H04W 8/245; H04M 1/72522; H04M 1/72525; H04B 7/18571

USPC ............ 455/432.1, 435.1, 418, 445; 370/328
See application file for complete search history.

(56) References Cited

U.S. PATENT DOCUMENTS

| | | | | |
|---|---|---|---|---|
| 8,989,053 B1 * | 3/2015 | Skaaksrud | ............ | H04W 12/06 370/255 |
| 9,003,509 B1 * | 4/2015 | Movshovitz | ............ | G06F 21/31 726/10 |
| 9,060,263 B1 | 6/2015 | Carames et al. | | |

(Continued)

OTHER PUBLICATIONS

3rd Generation Partnership Project; technical Specification Group Services and System Aspects; Architecture enhancements to facilitate communications with packet data networks and applications (Release 13), 3GPP Standard; 3GPP TS 23.682, 3rd Generation Partnership Project (3GPP), Mobile Competence Centre; Jun. 2016, pp. 1-91, vol. SA WG2, No. V13.6.0, XP051123550.

(Continued)

*Primary Examiner* — Danh C Le
(74) *Attorney, Agent, or Firm* — Young & Thompson

(57) ABSTRACT

The invention relates to a method for registering a roaming device to a mobile communication network, the method comprises: receiving a request over a specific communication mode from the roaming device, determining the at least one communication route to the server at least in part based on the request received in the network node, generating an inquiry to the server regarding the roaming device over the determined communication route, receiving a response from the server over the determined communication route, and in response to a determination that data in the response so indicates registering the device for utilizing the mobile communication network over the specific communication mode. The invention relates also to a network node and a computer program product.

15 Claims, 3 Drawing Sheets

(51) Int. Cl.
*H04M 1/725* (2006.01)
*H04W 88/02* (2009.01)

(56) References Cited

U.S. PATENT DOCUMENTS

| | | | | |
|---|---|---|---|---|
| 9,130,823 | B2* | 9/2015 | Park | H04L 12/66 |
| 9,984,395 | B1* | 5/2018 | Burcham | G06Q 30/02 |
| 2006/0274733 | A1* | 12/2006 | Mussman | H04L 29/06027 |
| | | | | 370/352 |
| 2007/0053334 | A1* | 3/2007 | Sueyoshi | H04L 12/2856 |
| | | | | 370/338 |
| 2007/0214283 | A1* | 9/2007 | Metke | H04L 29/12066 |
| | | | | 709/245 |
| 2007/0281687 | A1* | 12/2007 | Jiang | H04W 8/20 |
| | | | | 455/433 |
| 2007/0293216 | A1* | 12/2007 | Jiang | H04W 4/12 |
| | | | | 455/433 |
| 2008/0165714 | A1* | 7/2008 | Dettinger | H04W 52/0261 |
| | | | | 370/311 |
| 2010/0158201 | A1* | 6/2010 | Vijay Marathe | H04M 3/42306 |
| | | | | 379/36 |
| 2013/0103833 | A1* | 4/2013 | Ringland | H04L 63/0823 |
| | | | | 709/224 |
| 2013/0262696 | A1* | 10/2013 | Watanabe | H04L 45/00 |
| | | | | 709/238 |
| 2017/0161702 | A1* | 6/2017 | Wood | G06Q 20/1235 |
| 2018/0077027 | A1* | 3/2018 | VanderKwaak | H04L 41/0893 |
| 2018/0124590 | A1* | 5/2018 | O'Connell | H04W 8/02 |

OTHER PUBLICATIONS

3rd Generation Partnership Project; Technical Specification Group Services and System Aspects General Packet Radio Service (GPRS) enhancements for Evolved Universal Terrestrial Radio Access Network (E-UTRAN) access (Release 13), 3GPP Standard; 3GPP TS 23.401, 3rd Generation Partnership Project (3GPP), Mobile Competence Centre, Mar. 2016, vol. SA WG2, No. V13.6.1, XP051088382.
EP Search Report, dated Aug. 10, 2017, from corresponding EP application No. 17159620.8.

* cited by examiner

ROAMING SOLUTION

TECHNICAL FIELD

The invention concerns in general the technical field of communication networks. More particularly, the invention concerns a solution in a roaming situation.

BACKGROUND

An increase in a number of devices connected to communication networks requires novel approaches in managing the connections of the devices, and especially in providing services of a certain communication network to a new device within a service area of the communication network in question. Some specific issues raise up in a situation in which a device is brought to an operational area of a network, which is not a home network of a subscription residing in the device. For example, how a device, or the subscription, may be provided an access to a network when it is switched on a service area, which is not the home network of the subscription, and especially so that costs originating from the communication may be minimized. This kind of situations, and needs, arise when the concept of "Internet of Things" (IoT) gain ground. For example, in the context of IoT it may happen that a certain device is manufactured in some country, or area, and into which are arranged subscriber identity modules of some operator operating in the country of manufacture. After that the devices equipped with the subscriber identity modules are transported to some other country and taken into use there. In that kind of situation it would be advantageous that the setup and the use of the device minimizes the costs incurring from the communication especially because the device may remain permanently as a roaming subscriber.

The subscription refers herein to an arrangement by means of which the device may access to at least one mobile communication network. The subscription is implemented with a specific subscriber identity module arranged in the device. The subscriber identity module may be implemented as an integrated circuit in a smart card or by embedding the subscriber identity module on a circuit board of the device. The subscriber identity module securely stores the network identity, such as international mobile subscriber identity (IMSI) number and its related key, which are used for identifying and authenticating subscribers in the communication network. The subscriber identity module is granted by a mobile telecom operator.

Thus, there is need to introduce solutions in the area which may at least in part improve the current situation.

SUMMARY

The following presents a simplified summary in order to provide basic understanding of some aspects of various invention embodiments. The summary is not an extensive overview of the invention. It is neither intended to identify key or critical elements of the invention nor to delineate the scope of the invention. The following summary merely presents some concepts of the invention in a simplified form as a prelude to a more detailed description of exemplifying embodiments of the invention.

An objective of the invention is to present a method, a network node and a computer program product for arranging a device to utilize a mobile communication network services. Another objective of the invention is that the method, the network node and the computer program product enable the utilization of services as a visiting subscriber with optimal communication mode with respect to the application area The objectives of the invention are reached by a method, a network node and a computer program product as defined by the respective independent claims.

According to a first aspect, a method for registering a roaming device to a mobile communication network is provided, the method comprises: receiving, in a network node, a request over a specific communication mode from the roaming device for utilizing the mobile communication network for communication, the request comprising data indicating at least in part at least one communication route to a server hosting a service the roaming device is configured to implement to; determining, by the network node, the at least one communication route to the server at least in part based on the request received in the network node; generating, by the network node, an inquiry to the server regarding the roaming device over the determined communication route; receiving, in the network node, a response from the server over the determined communication route, the response comprising data indicating if the roaming device is allowed to utilize the mobile communication network for communication; and in response to a determination that the data in the response indicates that the roaming device is allowed to utilize the mobile communication network for communication registering the device in the mobile communication network for utilizing the mobile communication network for communication over the specific communication mode.

The method may further comprise a generation of a response message to the device over the specific communication mode, the response message indicating that the roaming device is allowed to utilize the mobile communication network.

The inquiry to the server regarding the roaming terminal device may be generated through a home mobile communication network.

The information relating to a roaming of the device in the mobile communication network may be inquired in the inquiry from the home mobile communication network in response to a receipt of the request over the specific communication mode.

The inquiry may further comprise information relating to a task specific to the device.

The inquiry may further be generated for requesting device specific information from the server. The requested device specific information may relate to configuration settings of the device.

The specific communication mode may be to Non-IP Data Delivery, NIDD, mode.

According to a second aspect, a network node for registering a roaming device to a mobile communication network is provided, the network node comprising: at least one processor; at least one memory including computer program code; the at least one memory and the computer program code configured to, with the at least one processor, cause the network node to perform: receive a request over a specific communication mode from the roaming device for utilizing the mobile communication network for communication, the request comprising data indicating at least in part at least one communication route to a server hosting a service the roaming device is configured to implement to; determine the at least one communication route to the server at least in part based on the request received in the network node; generate an inquiry to the server regarding the roaming device over the determined communication route; receive a response from the server over the determined communication route, the response comprising data indicating if the roaming device is allowed to utilize the mobile communication network for communication; and in response to a determination that the data in the response indicates that the roaming device is allowed to utilize the mobile communication network for communication register the device in the mobile communication network for utilizing the mobile communication network for communication over the specific communication mode.

The network node may further be caused to perform: generate a response message to the device over the specific communication mode, the response message indicating that the roaming device is allowed to utilize the mobile communication network.

The network node may be configured to generate the inquiry to the server regarding the roaming terminal device through a home mobile communication network.

The network node may further be configured to inquire information relating to a roaming of the device in the mobile communication network from the home mobile communication network in response to a receipt of the request over the specific communication mode.

The network node may further be configured to inquire information relating to a task specific to the device in the inquiry.

The network node may further be configured to generate the inquiry for requesting device specific information from the server. The requested device specific information may relate to configuration settings of the device.

The specific communication mode may be to Non-IP Data Delivery, NIDD, mode.

According to a third aspect, a computer program product is provided, the computer program product comprising at least one computer-readable storage medium having computer-executable program code instructions stored therein for performing the method as described when the computer program product is executed on a computer.

Various exemplifying and non-limiting embodiments of the invention both as to constructions and to methods of operation, together with additional objects and advantages thereof, will be best understood from the following description of specific exemplifying and non-limiting embodiments when read in connection with the accompanying drawings.

The verbs "to comprise" and "to include" are used in this document as open limitations that neither exclude nor require the existence of unrecited features. The features recited in dependent claims are mutually freely combinable unless otherwise explicitly stated. Furthermore, it is to be understood that the use of "a" or "an", i.e. a singular form, throughout this document does not exclude a plurality.

BRIEF DESCRIPTION OF FIGURES

The embodiments of the invention are illustrated by way of example, and not by way of limitation, in the figures of the accompanying drawings.

FIG. 1 illustrates schematically illustrates an example of a communication environment into which the present invention may be implemented to.

DESCRIPTION OF THE EXEMPLIFYING EMBODIMENTS

The specific examples provided in the description given below should not be construed as limiting the scope and/or the applicability of the appended claims. Lists and groups of examples provided in the description given below are not exhaustive unless otherwise explicitly stated.

Figure 1:
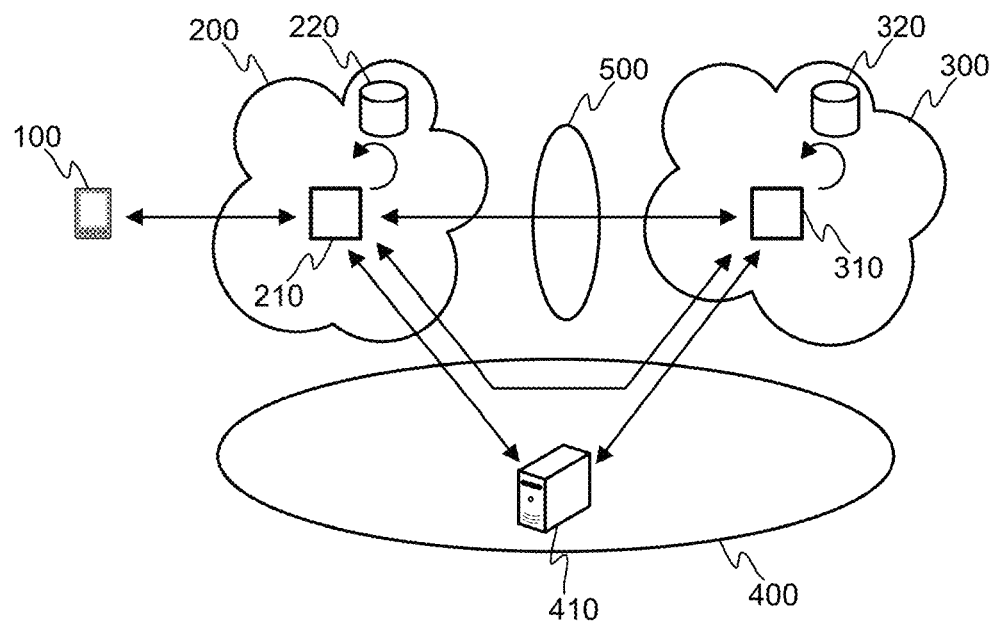

FIG. 1 schematically illustrates an example of a communication environment into which the present invention may be implemented to. A device equipped with a subscription to a mobile communication network is brought to an operational area of a mobile communication network 200 into which the device 100 may register as a visiting subscriber, or a roaming subscriber. The mobile communication network 200 in which the device is a roaming subscriber is called as a visited mobile communication network (VPLMN) and referred with a reference number 200 from now on. The subscription in the device 100 belongs to a home mobile communication network 300. The visited mobile communication network 200 and the home mobile communication network 300 may reside apart from each other or they may overlap at least in part. For the purpose of describing the present invention the aim is that the device 100 intends to register to the visited mobile communication network 200, i.e. the device 100 ends up as a roaming subscriber in the visited mobile communication network 200. The mobile communication networks 200, 300 comprises typical network elements and entities, such as a radio access network comprising base stations and controllers thereto, and a core network comprising network management entities and registers, among other. For the purposes of describing the present invention both mobile communication networks may comprise a network node 210, 310 and databases 220, 320. The network node 210, 310 may refer to a network management entity, or any other entity which may be configured to operate as will be described. Some non-limiting examples of the network node 210, 310 may be Mobility Management Entity (MME), Serving Gateway (SGW), Packet Data Network Gateway (PGW) or Service Capability Exposure Function (SCEF), for example. In FIG. 1 there is also illustrated a data network 400 in which an application server 410 may reside. The data network may e.g. be Internet network. In some other communication environment the application server 410 may reside in either one of the mobile communication networks 200, 300. The mentioned networks 200, 300, 400, and the referred network entities, such that the network nodes 210, 310 and the application server 410, may be communicatively coupled to each other either directly or indirectly. Moreover, the network node 210, 310 in the corresponding mobile communication network 200, 300 is advantageously communicatively coupled, either directly or indirectly, to the database 220, 320 residing in the same mobile communication network 200, 300 as the network node 210, 310 in question. Hence, the network node 210, 310 may perform inquiries to the corresponding database 220, 320 for reading and writing data therefrom and thereto.

Figure 2:
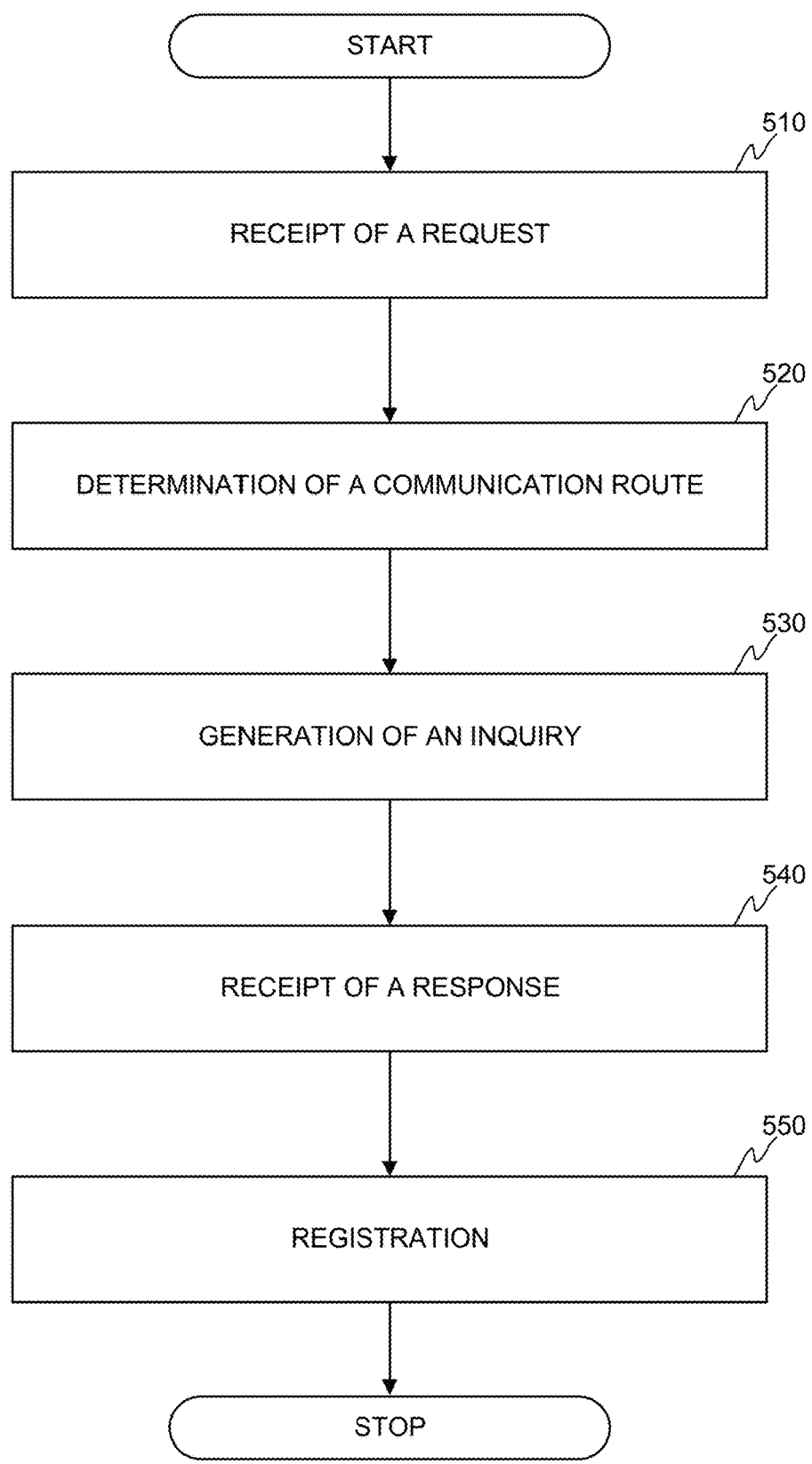
FIG. 2 illustrates schematically a method according to an embodiment of the invention.

Now at least some aspects of the present invention are described by referring to FIG. 2 in which an embodiment of a method according to the present invention is schematically illustrated. The solution according to the present invention introduces at least a method for registering a roaming device to a mobile communication network, which device is referred with a reference number 100 in FIG. 1.

In the following it is introduced at least some of the method steps by means of which at least some objects of the present invention may be achieved. Prior to the execution of the method a device 100 equipped with a subscriber identity module is brought to an operational area of a mobile communication network called as a visited mobile communication network 200. Due to the subscriber identity module residing in the device 100 the registration to the visited mobile communication network 200 occurs as a roaming subscriber. Thus, the device 100 intends to get registered to the visited mobile communication network 200 and may utilize the services provided, especially communication services, by the network.

Regarding Step 510:

In step 510 the device 100 may be configured to generate a request for accessing the visited mobile communication network 200. According to the present invention the request may be transmitted to the visited mobile communication network 200 over a specific communication mode which is signaled to a network node 210 residing in the visited mobile communication network 200. The request may comprise data indicating at least in part at least one communication route to a server 410 hosting a service the roaming device 100 is configured to implement to. Additionally, the request may comprise data representing a characteristic relating to a roaming of the roaming device 100 in the mobile communication network. In other words, the data indicating at least in part the at least one communication route may refer to a route definition which is stored in a memory of the device 100 and added to the signaling in order to reach an intended end point of the communication, i.e. the application server 410. For example, the route definition may comprise a network address of the server 410, or any similar data by means of which the destination may be defined, or reached. The data representing the characteristic relating to the roaming, in turn, may refer to a piece of data which indicates to the network, or networks, or any element therein, that the device 100 is defined to roam on permanent basis in the visited mobile communication network 200. Based on this piece of data, i.e. the indication, a specific permanent roaming trigger may switch the roaming business model from "normal" to "specific" for this particular device 100, wherein the specific business model may e.g. be defined for IoT devices. This specific business model may e.g. be agreed between a telecom operator hosting the visited mobile communication network and a telecom operator hosting the home mobile communication network. As a non-limiting example, the agreement may relate, but is not limited to, to pricing of the communication or bandwidth provided for communication, for example. This kind of permanent roaming triggering may e.g. be implemented when the procedure for registering the device 100 is performed in the visited mobile communication network, as will be described. Moreover, from the request it is also derivable a piece of information which indicates either directly or indirectly the home mobile communication network of the subscription. This is, for example, derivable from the subscription identifier, such as from MSISDN number, which may be carried in the request. In some implementation of the present invention the request may also comprise a specific indicator indicating that the device 100 is willing to utilize the specific communication mode for the communication for which the registration is performed. The same may also be determined from the request itself as it is received over the specific communication mode.

According to at least one embodiment of the invention the specific communication mode refers to Non-IP Data Delivery (NIDD) mode as defined in 3GPP specification. The NIDD is designed to minimize overhead for sending/receiving infrequent and small data packets. There is no need to set up a data radio bearer, but the packets are sent on the signaling radio bearer. The NIDD allows use of any unstructured data, thus it may be rather easily reused to carry the pieces of information specific for described purpose.

Regarding Step 520:

In response to the receipt of the request 510 in the network node 210 the network node 210 may be configured to recognize from the request that the utilization of the visited mobile communication network, i.e. the services therefrom, for communication is requested by the device 100 and to determine the communication route 520 from the request. For example, the determination of the communication route 520 may comprise a procedure by means of which network address of the destination, i.e. the application server 410, may be obtained.

More specifically, the determination of the communication route may comprise a determination of the route through which the application server 410 may be reached. The determination of the route may comprise an inquiry towards a database 220, which may store information relating to the route, or route selection. For example, the database 220 may comprise information relating to a roaming agreement between an operator of the home mobile communication network 300 and an operator of the visited mobile communication network 200. The database 220 may be updated with information stored in a database 320 residing in the home mobile communication network 300. The stored information in the database 220 may e.g. comprise information for devices 100, which are arranged to permanently roam in the visited mobile communication network 200. The network node 210 may be configured to determine, based on the obtained information or any part of it, to select an optimal route to the application server 410. The selection may be performed by selecting the route, which optimizes, i.e. typically minimizes, the costs incurring from the routing, or on any other applicable basis. In principle, the access to the application server 410 may be routed either directly from the visited mobile communication network 200 to the application server 410. Alternatively, the access to the application server 410 may be performed through a network node 310 residing in the home mobile communication network 300. In such a case the network node 210 may first transmit the inquiry to the network node 310 residing in the home mobile communication network 300, which forwards the inquiry towards the application server 410. The communication between the first network node 210 and the second network node 310 may be implemented either through the data network 400 or through a specific network, or interworking network element 500, which may be configured to operate between the mobile communication networks 200, 300. The network may e.g. refer to so called Inter-network Packet Exchange (IPX) which merely defines a network layer protocol for exchanging information between the mobile communication networks 200, 300.

As a result of the step 520 the network node 210 is aware of the route through which it accesses the application server 410.

Regarding Step 530:

Now, the network node 210 is aware of the communication route, such as a network address of the application server 410 and a route accessing the server 410. Next the network node 210 may be configured to generate an inquiry to the application server 410 in order to provide or obtain predetermined information to or from the application server 410. The predetermined information may be relevant for the operation of the device 100. For example, it may inform the application server 410 on the network the device 100 resides and/or it may provide information relating to a task specific to the device 100. Moreover, the inquiry may be generated so that it is further requested the device 100 specific information, such as configuration settings from the application server 410, or anything similar, e.g. for operating in the visited communication network over the specific communication mode. Moreover, the network node 210 may be configured to include some visited mobile communication network 200 related information, such as one or more rules or requirements for registering the device 100 for communicating over the specific communication mode. In some embodiment of the invention the application server 410 may be requested to confirm the rules or requirements, or to provide some further information relating to the registration in order to provide the device the access for permanent roaming in the visited mobile communication network.

Regarding Step 540:

In response to the inquiry towards the application server 410 the network node 210 may receive a response from the application server 410. The response is delivered over the communication route determined in the step 530, as described. The response may advantageously comprise data indicating if the roaming device 100 is allowed to utilize resources of the visited mobile communication network 200 for communication, for example. Moreover, the data may also comprise information for setting up the device 100, such as configuration settings, or any information the network node 210 requested from the application server 410, as described in the context of the previous step.

Regarding Step 550:

If the response received in step 540 by the network node 210 indicates that the device 100 may be served by the visited mobile communication network 200 the network node 210 may be configured to register the device 100 to the visited mobile communication network 200 e.g. for generating necessary data record e.g. for accounting an entity behind the subscription residing in the device 100. Moreover, the network node 210 may be configured to generate a response message to the device 100 for indicating the access to utilize the services of the visited mobile communication network 200 over the specific communication mode. The response message is transmitted over the specific communication mode, such as in a NIDD response, to the device 100. In this manner an access to utilize the services of the visited mobile communication network over the specific communication mode may be arranged for the device 100 in the visited mobile communication network 200.

The registration in response to the procedure as described may refer, but is not limited to, establishing a data record in the network node 210, or in a register 220 accessible by the network node 210, for managing the subscription of the device 100 in order to provide services of the visited mobile communication network 200 to the device 100. The services may at least comprise an enablement of the device 100 to communication with the network node 210, either directly or indirectly, over the specific communication mode. The data record may comprise accounting related information, security related information subscription related information and communication mode related information among any other piece of information. The registration may also cause setting up an indicator to the account that the device 100, i.e. the roaming subscriber, may utilize a specific business model e.g. agreed between a telecom operator hosting the visited mobile communication network 200 and a telecom operator hosting the home mobile communication network 300. As a non-limiting example, the agreement may relate, but is not limited to, to pricing of the communication or bandwidth provided for communication, for example. As a result the specific business model definition may have effect when the service provider providing the service the device 100 is implementing to, either with or without of an interaction with the application server 410, is accounted for the services used in the visited mobile communication network 200 by the device 100.

Figure 3A:
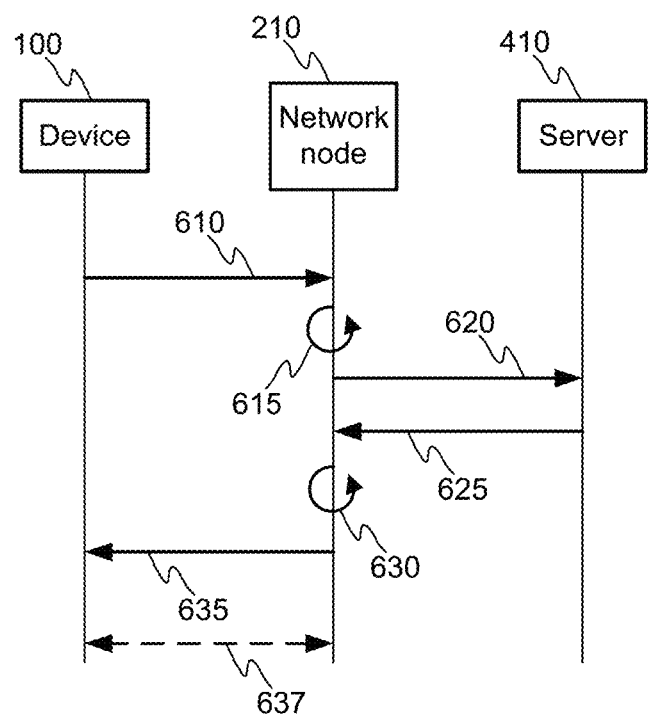
FIGS. 3A and 3B illustrate schematically examples of signaling in different embodiments of the invention.
Figure 3B:
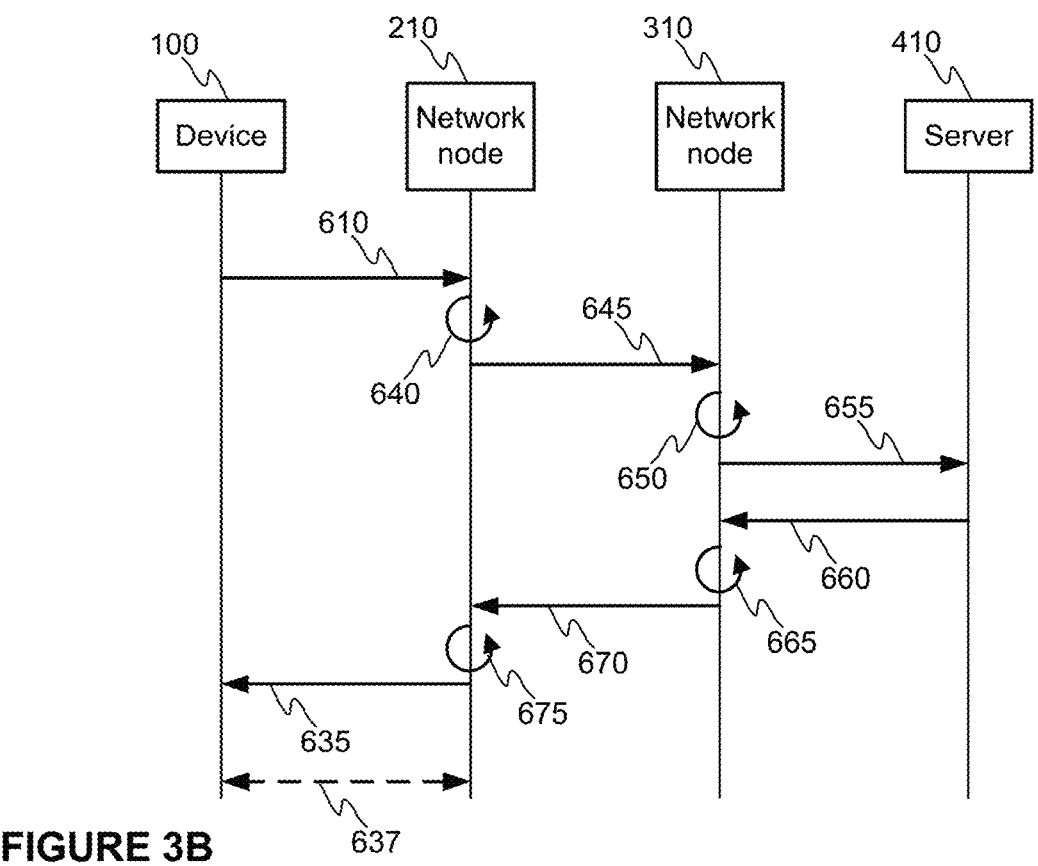

In FIGS. 3A and 3B it is schematically illustrated non-limiting examples of a signaling in two different implementations of the present invention. FIG. 3A schematically illustrates signaling in a situation in which the network node 210 is configured to directly communicate with the server 410. First, the device 100 is brought to an operational area of the mobile communication network 200 and activated so that it causes the device 100 to generate a request as described over a specific communication mode, such as NIDD, which is signaled to the network node 210 in a signal 610. In response to the receipt of the signal 610 the network node 210 may be configured to recognize from the request that the specific communication mode is requested by the device 100 and to determine the communication route 520 from the request, at least in part. The determination of the communication route may comprise an inquiry towards a database 220. The described procedure in the network node 210 is referred with 615 in FIG. 3A. In response to a receipt of the inquired information the network node 210 may, in the implementation as depicted in FIG. 3A, generate an inquiry 530 towards an application server 410 which may be configured to provide at least part of the service to the device 100. This is indicated with a signal 620 in FIG. 3A. The application server 410 may be configured to generate a response message according to at least one predetermined rule and to signal it in signal 625 to the network node 410 with the inquired information. The network node 210 receives the signal and may be configured to determine information from the response message, such as if the roaming device 100 is allowed to utilize resources of the visited mobile communication network 200 for communication over the specific communication mode or not. Moreover, the determination of the information may cause the network node 210 to establish registration information for the device 100, which may refer to an establishment of an account for the permanently roaming subscription, and to store data accordingly in a memory or in any data storage accessible to the network node 210. The network node 210 may also be configured to generate a response message to the device 100. The described procedure performed in the network node 210 is indicated with an arrow 630 in FIG. 3A. In a signal 635 the network node 210 may be configured to transmit the generated response message to the device 100. The transmission of the response message may be performed over the specific communication mode, such as over the NIDD. As a result, a subscription record is established in the visited mobile communication network 200 and the device may be granted an access to utilize services provided by the mobile communication network, such as accessing the application server 410.

FIG. 3B schematically illustrates signaling in a situation in which the network node 210 is configured to communicate with the application server 410 through a home mobile communication network 300 into which the subscription in the device 100 belongs to. Again, the device 100 is brought to an operational area of the mobile communication network 200 and activated so that it causes the device to generate a request over a specific communication mode, which is signaled to the network node 210 in a signal 610. In response to the receipt of the signal 610 the network node 210 may be configured to recognize from the request that the specific communication mode is requested by the device 100 and to determine the communication route 520 from the request, at least in part. The determination of the communication route may comprise an inquiry towards a database 220. As a non-limiting example, the signal 610 may e.g. carry information on the home telecom operator of the subscription residing in the device 100. Based on this information the network node 210 may be configured to initiate an inquiry towards the database 220 for acquiring information by means of which it is possible to determine, either directly or indirectly, a communication route to an application server 410. The procedure performed with the network node 210 at this stage is referred with 640 in FIG. 3B. In response to a route determination the network node 210 may, in the implementation as depicted in FIG. 3B, generate an inquiry 530 towards an application server 410 through a home mobile communication network 300. Hence, the network node 210 may be configured to generate a signal, referred with 645 in FIG. 3B, to a network node 310 residing in the home mobile communication network 300. The route through which the signal is delivered to the home network may vary. For example, the communication may be performed either through the data network 400 or through a specific network, or interworking network element 500, which is at least configured to operate between the mobile communication networks 200, 300. In order to select the route for communication the networks 220, 300 may be configured to exchange information by means of which the route may be selected, which information may be stored in at least one database 220, 320. The exchange of information may be performed either between the network nodes 210, 310, or through any other applicable network element. Furthermore, the exchange of information may comprise a step in which the network node 210 is configured to inquire information with respect to the roaming of the device from a network element in the home mobile communication network 300. The information inquired may e.g. comprise data relating to a communication route to an application server, a pricing, a timing of the communication, a device or any similar. The inquiry may be triggered to the receipt of the request for the utilization of the specific communication mode, for example. As said, in response to a route selection the network node 210 may be configured to generate and transmit a signal 645 to the network node 310 residing in the home mobile communication network 300, which may be configured to either directly or indirectly forward the signal to the application server 410. Prior to forwarding the signal to the application server 410 the network node 310 may be configured to obtain a predetermined piece of information from the signal 645 and based on that perform some predetermined procedure or procedures 650. For example, it may inquire information from a database 320 in order to determine some piece of information for e.g. generating a signal to the application server 410 or for obtaining information from the subscription in the device 100. Now, the network node 310 may generate a signal 655 to the server 410 for obtaining a piece of information for confirming that the device 100 may be granted an access to utilize services of the visited mobile communication network 200 over the specific communication mode. The application server 410 may be configured to generate a response message according to at least one predetermined rule and to signal it in signal 660 to the network node 310 with the information inquired. Again, the network node 310 may be configured to perform internal procedures 665 and to generate a signal 670 for providing inquired information to the network node 210. The network node 210 receives the signal 670 and may be configured to determine information from the response message, such as if the roaming device 100 is allowed to utilize resources of the visited mobile communication network 200 for communication or not. Moreover, the determination of the information may cause the network node 210 to establish registration information for the device 100, which may refer to an establishment of an account for the permanently visiting subscription, and to store data accordingly in a memory or in any data storage accessible to the network node 210. The network node 210 may also be configured to generate a response message to the device 100. The described procedure performed in the network node 210 is indicated with arrow 675 in FIG. 3B. In a signal 635 the network node 210 may be configured to transmit the generated response message to the device 100, as already described in the context of FIG. 3A. The transmission of the response message may be performed over the specific communication mode, such as over the NIDD. As a result, a subscription record is established in the visited mobile communication network 200 and the device may be granted an access to utilize services provided by the mobile communication network over the specific communication mode, such as accessing the application server 410.

The arrow referred with 637 in FIGS. 3A and 3B indicate the communication between the device 100 and the entity of the visited mobile communication network 200 over the specific communication mode, such as NIDD, when the registration is performed for the device 100, i.e. the subscription, to the visited mobile communication network and the device 100 is, thus, registered in the network.

As may become clear from the description above the communication between the device 100 and the network node 210 in the visited mobile communication network 200 may be implemented by utilizing the specific communication mode, preferably NIDD. The communication between the network node(s) 210, 310, application server 410 and the register(s) 220, 320 may be implemented by utilizing applicable communication protocols therein. For example, Internet Protocol, IP, may be utilized for the communication in which the request and response procedures may be applied to.

Figure 4:
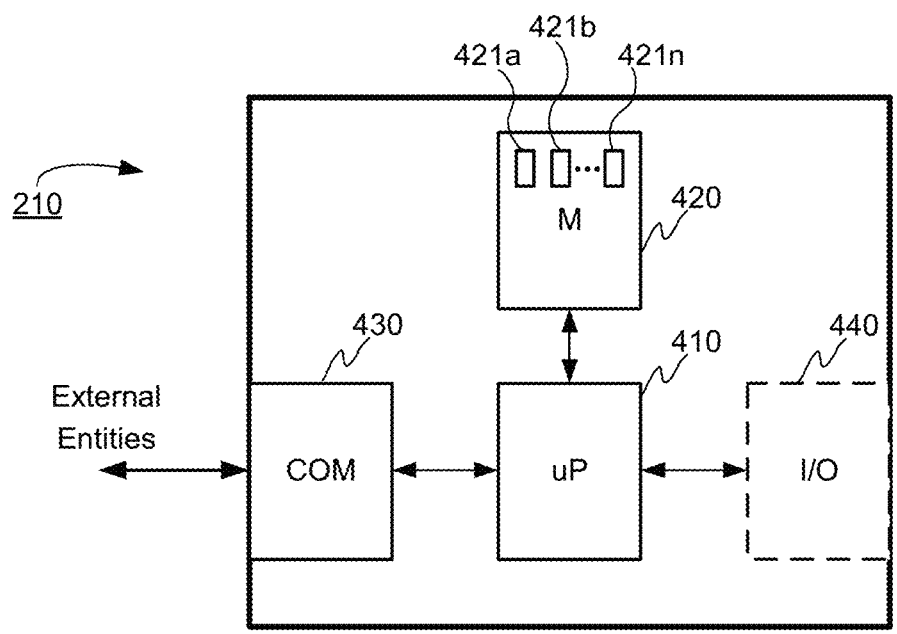
FIG. 4 illustrates schematically a network node according to an embodiment of the invention.

FIG. 4 illustrates schematically a network node 210 according to an example of the invention. The network node 210 may be configured to implement the method as described at least in part. The execution of the method may be achieved by arranging the processor 410 to execute at least some portion of computer program code 421*a*-421*n* stored in a memory 420 causing the processor 410, and, thus, the network node 210, to implement one or more method steps as described. Hence, the processor 410 may be arranged to access the memory 420 and retrieve and store any information therefrom and thereto. Moreover, the processor 410 may be configured to control the communication through the communication interface 430 with any external unit, such as with at least one of the following: the device 100, the application server 410, the network node 310, the register 220, and so on. Hence, the communication interface 430 may be arranged to implement a corresponding communication protocol, such as a protocol on which the communication on the specific communication mode may be arranged or TCP/IP protocol. The processor 410 may also be configured to control the output of information, i.e. data. The processor 410 may also be configured to control overall operability of the network node according to instructions stored in the memory 420 in a form of computer program code and parameters thereto. For sake of clarity, the processor herein refers to any unit suitable for processing information and control the operation of the apparatus, among other tasks. The mentioned operations may e.g. be implemented with a microcontroller solution with embedded software. Similarly, the invention is not limited to a certain type of memory only, but any memory type suitable for storing the described pieces of information may be applied in the context of the present invention. Even if it is disclosed that the method may be implemented with one network node, it may also be arranged that implementation of the method is performed in multiple network nodes operatively coupled to each other either directly or indirectly. Furthermore, the network node 210 may comprise user interface implemented with one or more I/O devices. Some non-limiting examples of the network node may be Mobility Management Entity (MME), Serving Gateway (SGW), Packet Data Network Gateway (PGW) or Service Capability Exposure Function (SCEF), for example.

Correspondingly, the device 100 may comprise at least one processor, at least one memory storing at least some portion of computer program code, at least one communication interface, at least one user interface implemented with one or more I/O devices, and at least one smart card for accessing at least the visited mobile communication network.

An aspect of the present invention may relate to a computer program product comprising at least one computer-readable storage medium having computer-executable program code instructions stored therein for performing the method as described when the computer program product is executed on a computer. The computer may refer to one or more computing units configured to execute the program code instructions.

The term "registration" herein may refer to predetermined procedures relating to a device, or the subscription, to be registered in the visited mobile communication network in order to utilize at least some services of the visited mobile communication network as a permanently roaming device. The registration may comprise, among other possible procedures, e.g. a setup of an account in the visited mobile communication network in order to enabling the utilization of the services of the mobile communication network in question.

The specific examples provided in the description given above should not be construed as limiting the applicability and/or the interpretation of the appended claims. Lists and groups of examples provided in the description given above are not exhaustive unless otherwise explicitly stated.

What is claimed is:

1. A method for registering a roaming device to a mobile communication network, the method comprising:
   receiving, in a network node, a request over a specific communication mode from the roaming device for utilizing the mobile communication network for communication, the request comprising data indicating, at least in part, route information of at least one communication route to a server hosting a service the roaming device is configured to implement to, said route information comprising a network address of said server, and said specific communication mode being Non-IP Data Delivery (NIDD) mode;
   determining, by the network node, the at least one communication route to the server at least in part based on the request received in the network node;
   generating, by the network node, an inquiry to the server regarding the roaming device over the determined communication route;
   receiving, in the network node, a response from the server over the determined communication route, the response comprising data indicating if the roaming device is allowed to utilize the mobile communication network for communication; and
   in response to a determination that the data in the response indicates that the roaming device is allowed to utilize the mobile communication network for communication registering the device in the mobile communication network for utilizing the mobile communication network for communication over the specific communication mode.

2. The method of claim 1, further comprising:
   generating a response message to the device over the specific communication mode, the response message indicating that the roaming device is allowed to utilize the mobile communication network.

3. The method of claim 1, wherein the inquiry to the server regarding the roaming terminal device is generated through a home mobile communication network.

4. The method of claim 1, wherein the information relating to a roaming of the device in the mobile communication network is inquired in the inquiry from the home mobile communication network in response to a receipt of the request over the specific communication mode.

5. The method of claim 1, wherein the inquiry includes information relating to a task specific to the device.

6. The method of claim 1, wherein the inquiry is further generated for requesting device specific information from the server.

7. The method of claim 6, wherein the requested device specific information relates to configuration settings of the device.

8. A computer program product comprising at least one non-transitory computer-readable storage medium having computer-executable program code instructions stored therein that causes a computer to perform the method of claim 1 upon execution of the computer program product by the computer.

9. A network node for registering a roaming device to a mobile communication network, the network node comprising:
   at least one processor;
   at least one memory in communication with the at least one processor and including computer program code stored therein, the computer program code configured to, upon execution by the at least one processor, cause the network node to perform operations to:
   receive a request over a specific communication mode from the roaming device for utilizing the mobile communication network for communication, the request comprising data indicating, at least in part, route information of at least one communication route to a server hosting a service the roaming device is configured to implement to, said route information comprising a network address of said server, and the specific communication mode being Non-IP Data Delivery (NIDD) mode,
   determine the at least one communication route to the server at least in part based on the request received in the network node, generate an inquiry to the server regarding the roaming device over the determined communication route, receive a response from the server over the determined communication route, the response comprising data indicating if the roaming device is allowed to utilize the mobile communication network for communication, and in response to a determination that the data in the response indicates that the roaming device is allowed to utilize the mobile communication network for communication register the device in the mobile communication network for utilizing the mobile communication network for communication over the specific communication mode.

10. The network node of claim 9, wherein the network node is further caused to generate a response message to the device over the specific communication mode, the response message indicating that the roaming device is allowed to utilize the mobile communication network.

11. The network node of claim 9, wherein network node is further configured to generate the inquiry to the server regarding the roaming terminal device through a home mobile communication network.

12. The network node of claim 9, wherein the network node is further configured to inquire information relating to a roaming of the device in the mobile communication network from the home mobile communication network in response to a receipt of the request over the specific communication mode.

13. The network node of claim 9, wherein the network node is further configured to inquire information relating to a task specific to the device in the inquiry.

14. The network node of claim 9, wherein the network node is further configured to generate the inquiry for requesting device specific information from the server.

15. The network node of claim 14, wherein the requested device specific information relates to configuration settings of the device.

* * * * *